W. L. Peters,
Mortising Machine,
Nº 2,878      Patented Dec. 12, 1842.
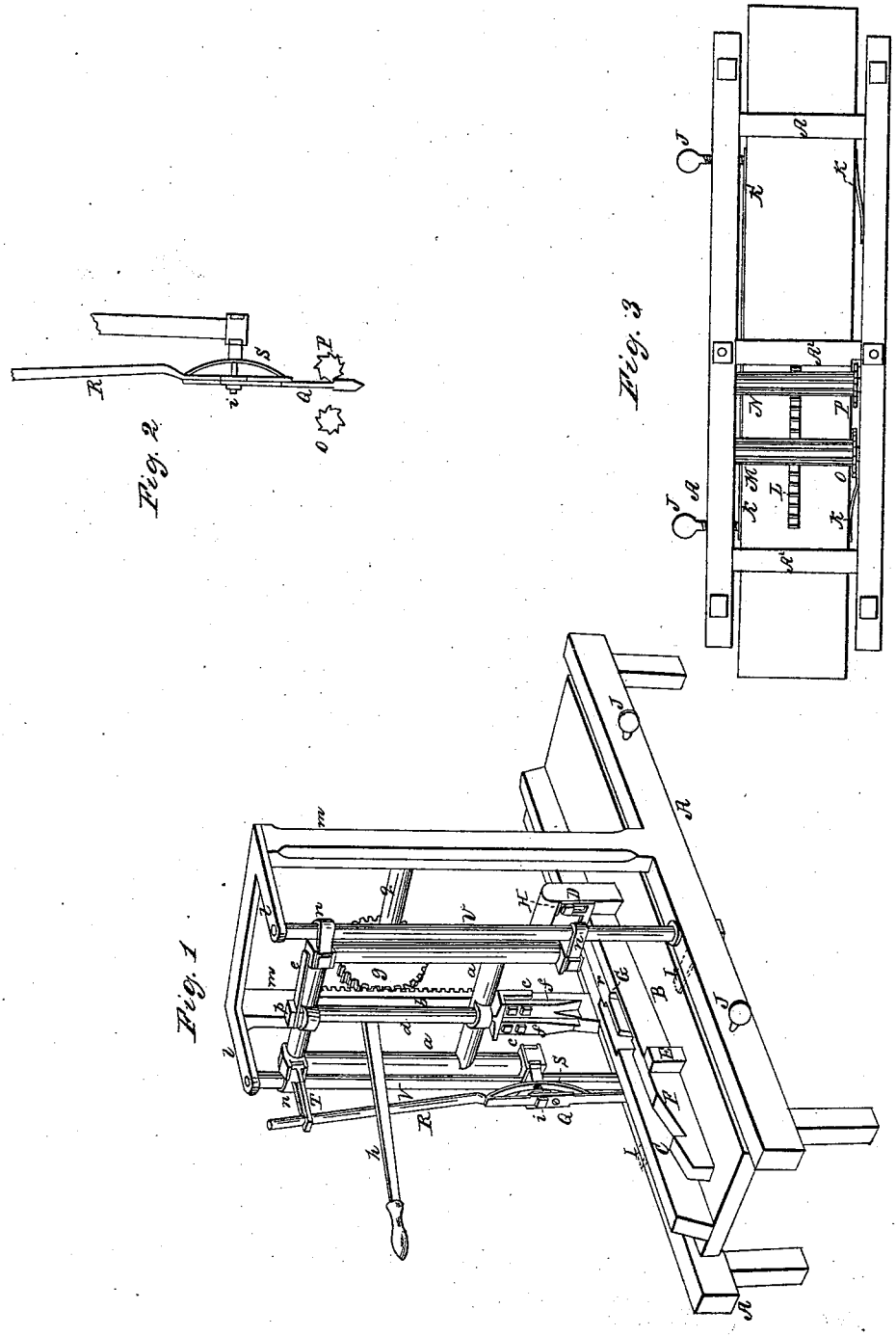

UNITED STATES PATENT OFFICE.

WARNER L. PETERS, OF FRANKFORD, PENNSYLVANIA.

MACHINE FOR MORTISING AND TENONING.

Specification of Letters Patent No. 2,878, dated December 12, 1842.

*To all whom it may concern:*

Be it known that I, WARNER L. PETERS, of Frankford, in the county of Philadelphia and State of Pennsylvania, have invented a new and useful Improvement in the Machine for Mortising and Tenoning, which is described as follows, reference being had to the annexed drawings of the same making part of this specification.

Figure 1 is a perspective view of the machine. Fig. 2 is a section of the feeding apparatus. Fig. 3 is a view of the under side of the machine.

The frame of this machine is made of suitable size, strength and material and is marked A in the drawing.

B is the carriage upon which the piece of timber to mortise or tenon is secured; C a guide fixed to the carriage against which the article to be wrought upon is placed—being mortised at or near the middle to allow the cutter or cutters to have free play without touching the guide; D a small vertical frame fastened to the carriage in which the article to be cut, or acted on, is placed and secured; E a vertical post inserted into the carriage between which and the guide a wedge is inserted for holding the article to be cut; F is the wedge just mentioned, mortised on the side next the guide at G to admit the cutters to work freely without touching the wedge—said wedge also passing between one of the posts of the vertical frame D and the guide C. H is a sliding clamp for holding down firmly upon the carriage the article to be acted on, said clamp being mortised and moving over the shanks of screw bolts inserted into the vertical frame D; I plates for holding down the carriage upon the cross timbers A² of the frame, said plates being fastened to the side timbers of the frame; J screws for moving the carriage from the side of the frame through which the screws pass to the opposite side where springs K are placed and which are contracted as the carriage is moved from the screws J. K are the aforesaid springs placed between the edge of the carriage and the side of the frame, which springs are extended as the screws are withdrawn, causing the carriage to move toward the side of the frame through which the screws pass. L is a rack fastened to the under side of the carriage by which it is moved back or fourth longitudinally by pinions; M, N, two parallel long leafed pinions for moving the carriage to or from either end of the frame as required by reversing their motions; O P two ratchet wheels on the ends of the axles of the pinions acted on by a double shouldered arm; Q the double shouldered arm for turning the ratchet wheels suspended to a screw $i$ inserted into the rising and falling gate containing the cutters said screw being provided with a nut for confining the arm—said arm being perforated with numerous holes to admit said screw for changing the sweep of the arm and movement of the ratchet wheels. R is a lever for changing the gear of the arm with one or the other ratchet wheel as required—perforated to admit the screw $i$ to pass through the same said screw serving as the fulcrum of the lever. S is a bow spring put on the screw for keeping the arm in gear with the ratchet wheels by pressing or bearing the lever against the arm; T notched frame for holding the lever in the position desired—the shank of which passing through the gate and fastened by a nut; U, V, two vertical parallel ways over which the gate slides up and down passed through the horizontal timbers of the frame and braced at the head by horizontal stays $l\ l$ extending from the tops of two posts $m$ of the frame A. $a$ is the sliding gate containing the cutters for mortising or tenoning provided with boxes $n$ of wood which slide vertically over the vertical round rods U V. $b$ is a vertical rack fastened to the gate $a$. $c$ is the stock to which the cutter is fastened. $d$ is the vertical stem of the stock which passes through round apertures in horizontal cross pieces of the gate secured at the head by a nut and screw $p$. $e$ is a lever or handle fixed to the top of the stem $d$ for turning it and the cutter at pleasure in the gate in order to reverse its position therein. $f\ f$ are cutters for cutting a tenon—fastened by screws to the stock and removable at pleasure for the substitution of other cutters to suit the kind of mortising or tenoning required. Each of the cutters $f$ are in the form of a right angle one side cutting next the shoulder of the tenon and the other side cutting next the side of the tenon. $g$ is a cog wheel for moving the gate attached to a horizontal axle $q$ passing through or turning in the two posts $m$ of the frame, which cog wheel is made to slide on the axle $q$ for throwing it in or out of gear with the rack at pleasure fastened by a pin to place desired. *h* is the lever or handle for turning the cog wheel *g* perforated at the short end to secure or attach a counter weight.

Operation: Secure the stile or piece of timber to be mortised or tenoned upon the carriage B in the position represented at *r* by the wedge F and clamp H. Depress the lever *h*; this will turn the cog wheel *g* which acts on the rack *b* causing the gate *a* to descend with the cutters *f* upon the stile *r* taking off portions of the wood on either side of the middle of the stile which will be left uncut to form the required tenon. The lever R is then moved toward the gate and secured in the frame T which brings the arm Q into gear with the ratchet O. The lever *h* is then raised which reverses the movement of the parts above mentioned, and at the same time causes the arm Q to act on the ratchet O which turns the pinion M and causes the carriage with the stile to advance toward the cutter (which will now be raised out of the way) as far as the intended cut. The lever *h* is again brought down which causes the cutters to take off other chips or portions of the stile and in this manner the operation is continued until the tenon is cut. The carriage is then run back by shifting the lever R forward to the front notch in the frame T and there securing it, which brings the arm Q into gear with the ratchet P which reverses the movement of the pinion N. The carriage being run back the stile is turned end for end and made fast by the wedge F and clamp H as before and a tenon cut on the other end, if required, by repeating the before described operations, or instead of changing the stile end for end it may be moved farther forward and secured by the wedge F and the cutters turned by means of the lever *e* and stem *d* which will effect the same object.

To cut a mortise a simple chisel must be substituted for the right angled cutters secured to the stock *d* by nuts and screws.

What I claim as my invention and which I desire to secure by Letters Patent is—

1. The before described improvements in the machine for mortising and tenoning timber, that is to say the combination of the lever R, arm Q, and spring S, with the ratchets O, P, as described.

2. Also the combination of the springs K and screws J with the carriage for regulating its position as described.

WARNER L. PETERS.

Witnesses:
Wm. P. Elliot,
E. Maher.